Sept. 3, 1968  J. L. BOGGS  3,399,579

REDUCTION DRIVE WITH INTERMITTENT ROTARY MOTION

Filed Feb. 27, 1967  2 Sheets-Sheet 1

INVENTOR
JAMES L. BOGGS

BY Louis A Kline
Elmer Wargo

HIS ATTORNEYS

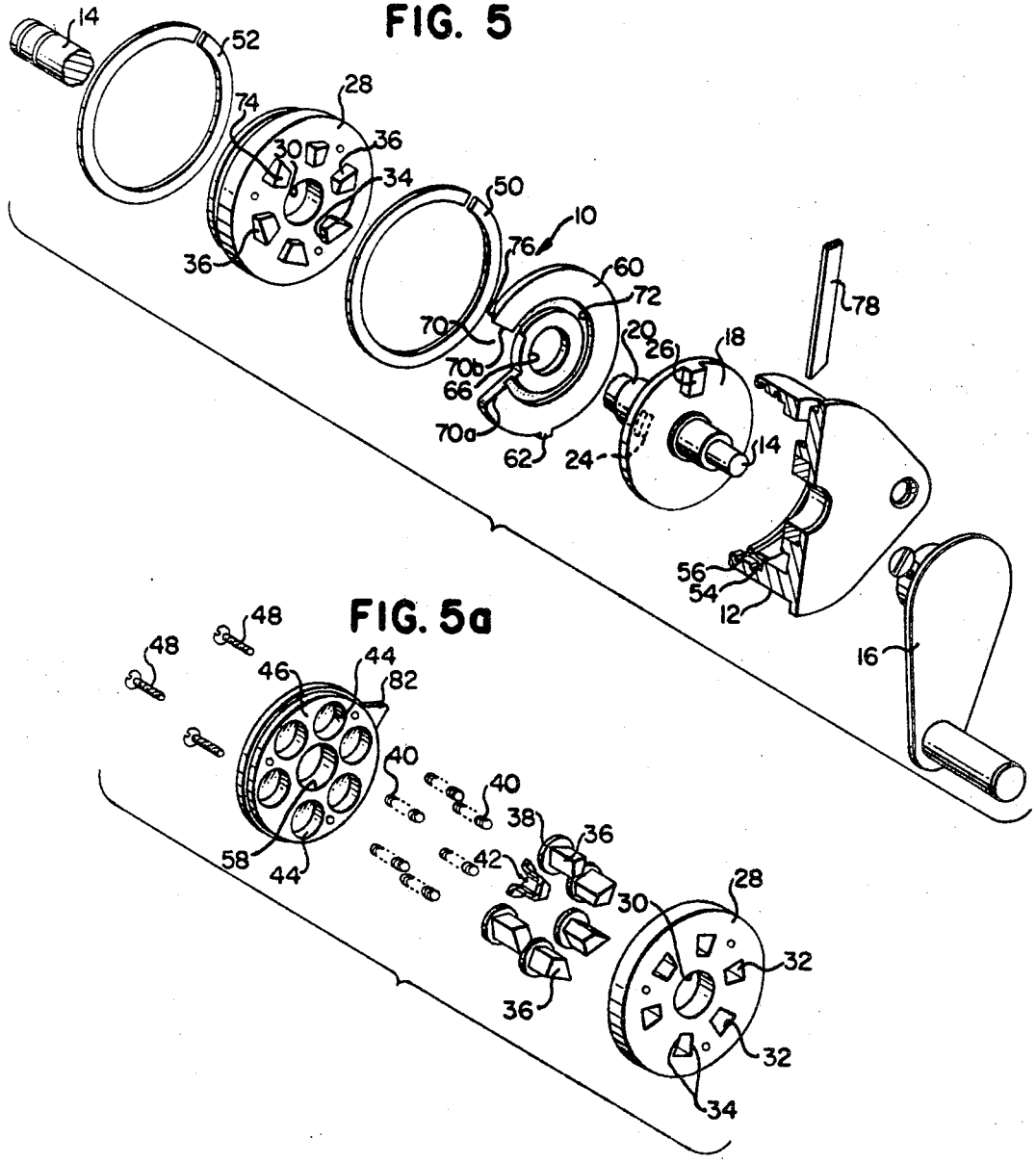

United States Patent Office 3,399,579
Patented Sept. 3, 1968

3,399,579
REDUCTION DRIVE WITH INTERMITTENT ROTARY MOTION
James L. Boggs, Covington, Ohio, assignor to The National Cash Register Company, Dayton, Ohio, a corporation of Maryland
Filed Feb. 27, 1967, Ser. No. 618,593
9 Claims. (Cl. 74—112)

ABSTRACT OF THE DISCLOSURE

An apparatus for producing reduced, intermittent, rotary motion including a rotatable output member having plungers slidably mounted therein to be spring-urged into a notched-out area of a stationary disc, in which area the plungers are engaged by a driving dog and arcuately moved across said area. At least one plunger is moved across said notched-out area per revolution of said driving dog.

---

This invention relates to a drive mechanism, and, more particularly, it relates to a drive mechanism for producing reduced, intermittent, rotary motion from an input of constant, rotary motion.

One of the problems encountered with prior art reduction drive mechanisms which employ gear trains to effect the reduction is the difficulty of obtaining compactness of the mechanisms, especially when reduction ratios of about 6 to 1 are desired.

A feature of the present invention is that it is compact, requiring only a few moving parts to effect reduced, intermittent, rotary motion output from an input of constant rotary motion. Another feature is the ease with which the drive mechanism can be altered to effect changes in the reduction ratios to suit specific applications.

The present invention includes a housing in which input and output means are rotatably mounted. The output means has a plurality of plunger members which are slidably mounted therein and which are resiliently urged in an axial direction towards the input means, which includes a rotatable disc having a driving dog secured thereto. Positioned between the input and output members is a coupling means which includes a notched disc which is detachably secured to the housing. The plunger members are arranged on said output means so as to enable at least one of said plunger members to extend into the notch in the disc to be engaged by the driving dog as it is rotated by the input means. The engaged plunger member is moved across the notch (thereby rotating the output member for a fraction of a revolution) to one of the extremities thereof, where the plunger member is disengaged from the driving dog. After disengagement of the plunger member and the driving dog, the driving dog continues to rotate until it encounters another plunger member in the notched area on a successive revolution of the driving dog. By changing the number of plunger members and the size of the notch in the notched disc, a variety of reduction ratios may be conveniently obtained.

Accordingly, the objects of this inventions are:

(a) To provide a compact reduction drive mechanism.

(b) To provide a compact reduction drive mechanism which is economical to manufacture and provides intermittent rotary motion.

(c) To provide a drive mechanism of the above type whose reduction ratios can be conveniently changed.

These and other objects and advantages will become more readily understood in connection with the following description and the drawings, in which:

FIG. 5 is an exploded view in perspective of the drive mechanism of this invention; and FIG. 5a is an exploded view in perspective of the output means shown in FIG. 5.

Figure 1:
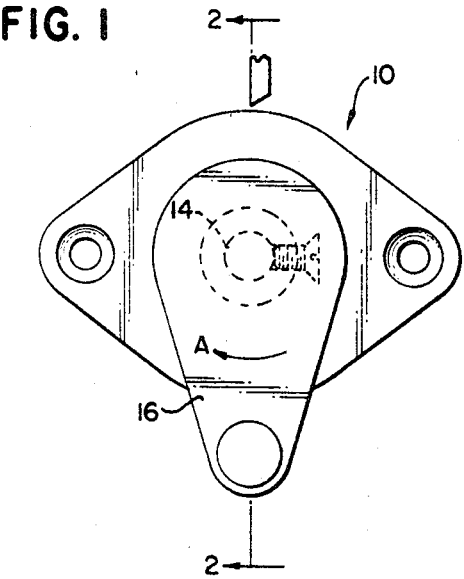
FIG. 1 is a front view in elevation of the drive mechanism of this invention showing a hand crank for providing rotary motion to the mechanism.

The drive mechanism 10 as shown in the drawings is composed of three major part groupings which are mounted in a cylindrical housing 12. The groupings include an input means, an output means, and coupling means operatively connecting the input and output means so as to provide reduced intermittent rotary motion output from an input of constant rotary motion.

The input means includes an input shaft 14, which is rotatably mounted in the housing 12. The shaft 14 may be rotated at a constant rate by a motor (not shown), or it may be rotated by the hand crank 16 (FIGS. 1, 2, 4, and 5), which is secured thereto. Also included in the input means is a planar input member such as the disc 18, which has a sleeve 20 secured to the shaft 14 by a pin 22. One face of the disc 18 has a driving dog (FIGS. 2, 4, and 5) extending therefrom, and the opposite face has a projection 26 extending therefrom. The functions of the dog 24 and the projection 26 will be later described.

The output means includes a plate member 28 (FIGS. 2, 4, 5, and 5a), which is rotatably mounted on its periphery inside the housing 12 and which has a bore 30 (FIG. 5) concentric with said periphery. The sleeve 20 of the disc 18 is loosely fitted in the bore 30, so that the disc 18 and the plate member 28 may rotate independently of each other.

The plate member 28 (FIGS. 5 and 5a) is provided with a plurality of trapezoidally-shaped holes 32, which are arranged in equally-spaced relation on a circle which is concentric with the axis of the shaft 14. The non-parallel sides 34 of the holes 32 are formed along radial lines on the plate member 28, and the holes 32 extend axially through said plate member.

Figure 4:
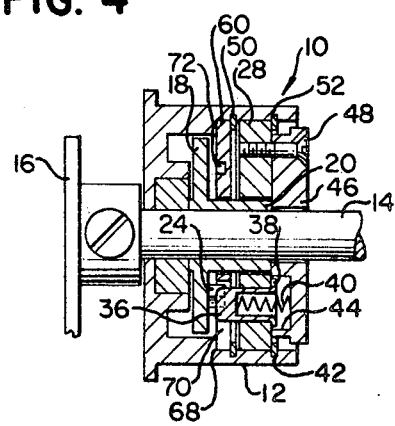
FIG. 4 is a cross-sectional view taken along the line 4—4 of FIG. 3, showing the driving dog of the input means about to enter a complementary annular groove on one face of the notched disc as the pertaining plunger member is cammed out of engagement with the driving dog by a camming surface on the opposite face of the notched disc.

The output means also includes one plunger member 36 for each trapezoidally-shaped hole 32. Each plunger member 36 is trapezoidal in cross-section so as to slidably fit in its respective hole 32. As seen best in FIGS. 2, 4, and 5a, each plunger member 36 has a flange 38 at one end thereof to limit the axial movement of the member 36 towards the disc 18 when the driving mechanism 10 is assembled as shown in FIG. 4. Each plunger 36 is urged towards the disc 18 by its respective compressed spring 40, which fits into a hollow portion 42 (FIG. 5a) of the plunger members 36 and abuts against the face of a circular recess 44 located in a circular back-up plate 46. The recesses 44 are dimensioned to receive the flanges 38 therein and are so arranged on the plate 46 as to be in axial alignment with their respective plunger members 36. The plate 46 is detachably secured to the plate 28 by screws 48, as best shown in FIG. 4.

The plate 28 is fixed against axial movement in the housing 12 by slotted rings 50 and 52 (FIG. 4), which fit into complementary annular recesses 54 and 56 (FIG. 5) respectively and thereby hold the plate therebetween. The back-up plate 46 has a bore 58 (FIG. 5a), through which the shaft 14 extends.

Figure 2:
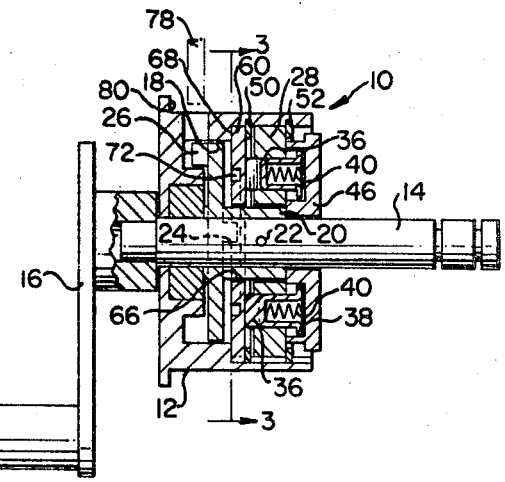
FIG. 2 is a side view, partly in cross-section, and taken along the line 2—2 of FIG. 1, showing details of the coupling means positioned between the input and output means.
Figure 3:
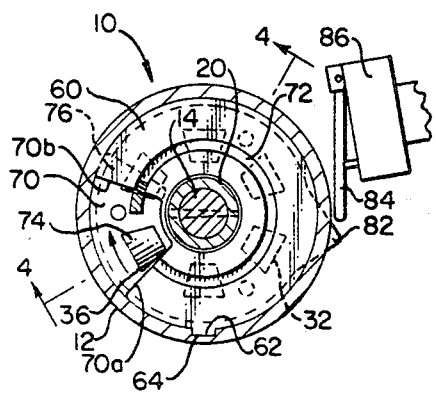
FIG. 3 is a cross-sectional view taken along the line 3—3 of FIG. 2, showing details of the notched disc of the coupling means and the plunger members associated with the output means.

The coupling means providing the operative connection between the input and output means previously described includes a stationary disc 60, which is positioned in the housing 12 between said input and output means. Extending from the periphery of the disc 60 is a projection 62 (FIGS. 3 and 5), which fits into a cooperating recess 64 (FIG. 3) in the housing 12 to prevent rotation of the disc 60 therein. The disc 60 is also suitably bored at 66 to permit the sleeve 20 to pass therethrough, as shown in FIGS. 2, 3, and 4. The disc 60 is restrained against axial movement in the direction in the housing 12 by abutting an annular shoulder 68 (FIGS. 2 and 4) and is restrained against axial movement in the opposite direction by the slotted ring 50. Disposed in that face of the disc 60 which is adjacent to the disc 18 is an annular groove 72 concentric with the bore 66. A notch 70 extends from the periphery of the disc 60 inwardly beyond the groove 72. One edge of the notch 70 is designated 70a, while the other edge, 70b, includes a cam face 76, which cooperates with cam faces 74 on the plunger members 36. Most of the time, the plunger members 36 abut against the face of the disc 60 which is adjacent to the plate 28; however, there is always at least one plunger member which is urged into the notched-out area 70 of the stationary disc 60 by its respective spring 40, as shown in FIGS. 3 and 4.

The method of operation of the driving mechanism 10 is as follows: As the input crank 16 is rotated clockwise, as shown by the arrow A in FIG. 1, it rotates the disc 18 in the same direction. The driving dog 24, projecting from the disc 18, is rotated in the annular groove 72 located in the adjacent face of the stationary disc 60 (FIGS. 2 through 5). As the dog 24 is rotated into the notched portion 70 of the disc 60, it engages the plunger 36 which is closest to the edge 70a (FIG. 3). In the embodiment shown in FIG. 3, only one plunger 36 is present in the notched portion 70, although a greater number may be present when different reduction ratios are being obtained. Upon engaging the last-named plunger 36, the driving dog 24 arcuately moves said plunger clockwise, as viewed in FIG. 3, to incrementally rotate it as well as the plate 28, which is part of the output means. Upon being moved to the edge 70b of the notched portion 70, the plunger member 36 is cammed axially towards the plate member 28 (as viewed in FIG. 4) and out of engagement with the driving dog 24 by the cooperative camming faces 74 and 76 located on the plunger members 36 and the stationary disc 60, respectively, as shown in FIG. 5.

In the embodiment shown in the drawings, the plungers 36 are trapezoidal in cross-section, so as to maintain the camming faces 74 and 76 in cooperative relationship with each other. For ease in manufacturing, the plungers 36 may be made circular in cross-section (not shown) and be slidably mounted in mating openings in the plate 28. When so made, the ends of the plungers which engage the cam face 76 are bullet-shaped to provide for cooperative camming relationship with the cam face 76.

As the plunger 36 is moved across the notched portion 70 from the edge 70a to the edge 70b, as viewed in FIG. 3, the next succeeding plunger approaches the edge 70a. By the time the engaged plunger is disengaged from the driving dog, as previously mentioned, the said succeeding plunger has moved clear of the edge 70a and has been urged into the notched portion 70 of the disc 60 by its respective spring 40, in which notched portion said succeeding plunger will remain until it is engaged by the driving dog on its next rotation.

The particular reduction ratio desired can be readily obtained by the driving mechanism 10. In the embodiment shown in the drawings, there are six plunger members 36, which are equally spaced on the plate member 28 to provide a six-to-one reduction ratio when used with a disc 60 having a sector-type notch portion 70 measuring approximately sixty degrees. In the embodiment shown, the notch portion 70 is actually a few degrees larger than sixty degrees to insure a sufficient clearance for the plunger 36 to be urged into the notch portion before the preceding plunger is cammed out of engagement with the driving dog 24.

To change the reduction ratio from six to one to a ratio of three to one, for example, it is necessary to change only the size of the notch portion 70 of the disc 60 from approximately sixty degrees to a size of approximately one hundred and twenty degrees; in which case, two plunger members would be present in said notch portion instead of one, as shown in the drawings. Each complete revolution of the crank 16 would then rotate the plate member 28 for two sixths of a revolution. If the hand crank 16 is rotated in a direction opposite to the arrow A (FIG.1), the closest plunger 36 which is adjacent to the edge 70a (FIG. 3) will abut thereagainst and prevent further rotation of the plate 28 in that direction.

The embodiment shown in the drawings is compact, having a housing 12 which is approximately one inch in diameter. The driving mechanism 10 can be made both larger and smaller in size with a greater or smaller number of plunger members to meet the needs of a specific application. With twelve plunger members 36, for example, many different reduction ratios can be obtained simply by changing the size of the notch portion 70.

In certain applications, it may be desirable to stop the hand crank 16 after each complete revolution. This is accomplished in the driving mechanism 10 by cooperation between the projection 26 on the disc 18 (FIG. 5) and a bar 78, which is slidably mounted in a suitable slot 80 (FIG. 2) in the housing 12. When the bar 78 is pushed into the housing 12, the rotation of the crank 16 will be stopped when the projection 26 abuts against the bar 78. Temporarily withdrawing the bar 78 out of the housing 12 to remove the bar out of the way of the projection 26 will permit the crank 16 to be turned for another rotation.

The output means, which includes the circular back-up plate 46, is provided with a lobe 82 (FIGS. 3 and 5a), which can operate an actuator arm 84 of a switch 86. A tubular output shaft (not shown), concentric to the shaft 14 and secured to the plate 46, may be used to obtain a conventional take-off shaft.

Another feature of the present invention is the ease with which several different drive ratios may be obtained from a common input shaft. For example, a driving mechanism 10 to effect a six-to-one reduction and a second driving mechanism 10 (not shown) to effect a three-to-one reduction may both be pinned to the same input shaft 14 to be actuated thereby.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:
1. A drive mechanism comprising:
   a housing;
   input means rotatably mounted in said housing and including a driving dog adapted to rotate therewith;
   output means rotatably mounted in said housing and having a plurality of plunger members movably mounted therein and resiliently urged towards said driving dog; and
   coupling means in said housing enabling said driving dog to rotate said output means a fraction of a revolution for each complete revolution of said input means;
   said coupling means including plate means providing an engagement area in which said driving dog engages one of said plunger members to rotate it and said output means for said fraction of a revolution;
said plunger members being arranged on said output means to provide one of said plunger members in said engagement area to be engaged by said driving dog on each successive revolution of said input means.

2. The drive mechanism as claimed in claim 1 in which said plate means is detachably secured to said housing and is positioned between said input means and output means.

3. The drive mechanism as claimed in claim 1 in which said plunger members are slidably mounted on said output means and are equally spaced from the rotating axis of said output means and from one another.

4. The drive mechanism as claimed in claim 3 in which only one of said plunger members appears in said engagement area to be engaged by said driving dog on each said successive revolution.

5. A drive mechanism comprising:
a housing;
a drive member fixed to rotate with said input shaft and having a driving dog adapted to rotate in a circle whose center lies on the axis of said shaft;
rotatable output means having a plurality of plunger members equally spaced thereon in the form of a circle whose center lies on said axis, said plunger members being slidably mounted in said output means for axial movement relative to said axis;
resilient means for urging said plunger members outwardly of said output means toward said driving dog; and
connecting means enabling said driving dog to engage each said plunger member in succession and move it a predetermined angular amount for each complete revolution of said driving dog to thereby incrementally rotate said output means.

6. The drive mechanism as claimed in claim 5 in which said connecting means comprises a disc having an axis coincident with the axis of said shaft, said disc being fixed to said housing and positioned between said drive member and said output means, said disc having a sector portion removed therefrom forming first and second radially aligned edges between which said plunger members may extend when urged by said resilient means, said driving dog successively engaging said plunger members at said first edge and moving them to said second edge where they are successively disengaged therefrom.

7. The drive mechanism as claimed in claim 6 in which said output means is rotatably mounted on said input shaft, and in which said disc has a camming surface adjacent to said second edge to facilitate the disengagement of said plunger members from said driving dog.

8. A drive mechanism for producing reduced, intermittent, rotary motion comprising:
a cylindrically shaped housing;
an input shaft rotatably mounted in said housing;
a driving disc fixed to rotate with said input shaft and having a driving dog extending from one side thereof;
rotatable output means whose axis of rotation is coincident with the axis of said shaft;
a stationary disc fixed to said housing and positioned between said output means and said driving disc and also having an axis coincident with the axis of said shaft;
said output means having a plurality of plunger members slidably mounted therein for movement in an axial direction relative to the axis of said shaft, means for resiliently urging said plunger members towards said stationary disc;
said stationary disc having a sector portion removed therefrom forming first and second radially aligned edges on said stationary disc, and an annular recess on one side of said stationary disc into which recess said dog rotates when said driving disc is rotated;
each said plunger member being adapted to be urged far enough through said sector to be engaged by said driving dog as it rotates between said first and second edges to move the engaged plunger member from said first edge to said second edge of said sector;
said second edge of said stationary disc having a camming surface thereon adapted to cam each said engaged plunger out of engagement with said driving dog as said driving dog is rotated past said second edge;
said plurality of plunger members being arranged in a circle on said output means and spaced equally thereon, and with each said plunger member being trapezoidally shaped in cross-section.

9. A drive mechanism comprising:
a housing;
an input shaft rotatably mounted in said housing;
a drive member fixed to rotate with said shaft and having a driving dog adapted to rotate in a circle whose center lies on the axis of said shaft;
rotatable output means having a plurality of plunger members arranged thereon in the form of a circle whose center lies on said axis, said plunger members being slidably mounted in said output means for axial movement relative to said axis;
resilient means for urging said plunger members outwardly of said output means toward said driving dog;
and coupling means having first and second edges forming a notch therein into which notch said plunger members may extend to be engaged by said driving dog;
said driving dog engaging the first one of said plunger members that it encounters in said notch near said first edge and moving said first one to said second edge where said first one is disengaged from said driving dog, the movement of said first one of said plunger members by said driving dog being effective to rotate said output means for an angular distance which is less than a complete revolution for one complete revolution of said driving dog.

References Cited
UNITED STATES PATENTS

| | | | |
|---|---|---|---|
| 1,036,359 | 8/1912 | Slentz | 192—33 |
| 1,479,970 | 1/1924 | Leppert | 74—112 |
| 2,820,370 | 1/1958 | Dolesh et al. | 74—126 |
| 2,828,636 | 4/1958 | Hall | 74—126 |
| 2,757,569 | 8/1956 | Isom | 74—112 |
| 3,124,009 | 3/1964 | Grover | 74—126 |
| 3,156,125 | 11/1964 | Straub | 74—126 |
| 3,320,822 | 5/1967 | Tatom | 74—126 |

FRED C. MATTERN, JR., *Primary Examiner.*

W. S. RATLIFF, *Assistant Examiner.*